United States Patent [19]

Wilson

[11] Patent Number: 4,990,377
[45] Date of Patent: Feb. 5, 1991

[54] BUFFERED SILANE EMULSIONS HAVING LOW VOLATILE ORGANIC COMPOUNDS WHEN CURED

[75] Inventor: Michael E. Wilson, Middleburg, Fla.

[73] Assignee: PCR Group, Inc., Gainesville, Fla.

[21] Appl. No.: 392,107

[22] Filed: Aug. 10, 1989

Related U.S. Application Data

[63] Continuation-in-part of Ser. No. 189,146, May 2, 1988, Pat. No. 4,877,654.

[51] Int. Cl.⁵ ............................................. B05D 3/02
[52] U.S. Cl. ................................. 427/387; 106/2; 106/287.13; 427/393; 427/393.4; 427/393.6; 428/447
[58] Field of Search ............... 106/2, 287.13; 427/387, 427/393, 393.4, 393.6; 428/447

[56] References Cited

U.S. PATENT DOCUMENTS

| | | | |
|---|---|---|---|
| 2,683,674 | 7/1954 | Hatcher et al. | 117/123 |
| 3,772,065 | 11/1973 | Seiler | 117/123 |
| 4,175,159 | 11/1979 | Raleigh | 428/405 |
| 4,228,054 | 10/1980 | Ona et al. | 260/29.2 |
| 4,342,796 | 8/1982 | Brown et al. | 427/136 |
| 4,433,013 | 2/1984 | Puhringer | 427/337 |
| 4,476,281 | 10/1984 | Vaughn, Jr. | 524/767 |
| 4,517,375 | 5/1985 | Schmidt | 556/463 |
| 4,525,213 | 6/1985 | Linn | 106/2 |
| 4,552,910 | 11/1985 | Deubzer et al. | 524/43 |
| 4,648,904 | 3/1987 | DePasquale et al. | 106/2 |
| 4,877,654 | 10/1989 | Wilson | 427/387 |

Primary Examiner—Michael Lusignan
Attorney, Agent, or Firm—Hedman, Gibson, Costigan & Hoare

[57] ABSTRACT

There are provided aqueous emulsions useful for rendering porous substrates water repellent having low volatile organic compound content when cured comprising effective amounts of (a) a hydrolyzable silane having a determinable pH-stable range, (b) an emulsifying agent having an HLB value of from 2 to 20, (c) a buffering compound to maintain the composition within the pH-stable range; and (d) water. Such buffered compositions are stable on long term storage and maintain high effective levels of active silane content even when they include biocides which may accelerate the hydrolysis of aqueous silane-containing compositions.

74 Claims, No Drawings

BUFFERED SILANE EMULSIONS HAVING LOW VOLATILE ORGANIC COMPOUNDS WHEN CURED

CROSS REFERENCE TO RELATED APPLICATION

This application is a continuation-in-part of commonly assigned co-pending application, Ser. No. 189,146, filed May 2, 1988, now U.S. Pat. No. 4,877,654.

FIELD OF THE INVENTION

This invention relates to buffered aqueous systems which are especially useful for rendering porous substrates water repellent. More particularly, the present invention relates to buffered emulsions of aqueous silanes, and/or oligomers thereof which have low levels of volatile organic compounds (VOC) when cured, and are useful in treating porous masonry and wood surfaces to render such surfaces water repellent, even when biocides are included in the composition.

BACKGROUND OF THE INVENTION AND PRIOR ART

The utility of silanes, especially alkoxysilanes, as masonry water repellents is widely known. Compositions currently in use employ solutions of silanes in various organic solvents such as alcohol, e.g., Seiler U.S. No. 3,772,065, and Brown et al. U.S. Pat. No. 4,342,796, or hydrocarbons, e.g., Linn, U.S. Pat. No. 4,525,213. Principal limitations of such solvent type compositions include the toxicity and the flammability of the solvents employed.

Aqueous silane compositions which are non-toxic and non-flammable have become important as effective masonry water repellent compositions, see, Puhringer, U.S. Pat. No. 4,433,013, Schmidt, U.S. Pat. No. 4,517,375 and DePasquale and Wilson, U.S. Pat. No. 4,648,904. Such compositions can have an important drawback, however, and that is that the pH may tend to drift and then the silane reacts with water and polymerizes. This reduces efficacy by reducing the content of active, water-repellent ingredient. Moreover, the pH of the system may shift when additives are included such as a biocide, which is commonly added to retard growth of fungi and the like. Although the stability of the water-containing emulsions can be enhanced to some extent by refrigerating them, or the problem of reduced efficacy can be avoided by using the emulsions soon after preparation, both expedients are not cost-effective and may in some cases cause waterproofing contractors to go back to the above-mentioned solvent borne, non-aqueous compositions.

Although the prior art has frequently demonstrated that silanes dispersed in water react to form silicone resins, see, e.g., Hatcher et al., U.S. Pat. No. 2,683,674 and Raleigh, U.S. Pat. No. 4,175,159, no easy way has been suggested to stabilize them. In some cases, the pH of the system has been adjusted to increase the rate of resin formation, e.g., Deubzer et al., U.S. Pat. No. 4,552,910 and Ona et al., U.S. Pat. No. 4,228,054, but pH control was not suggested as a stabilizing means. Stable hydrolyzed silane impregnating solutions useful as water repellents can also be prepared by dissolving some silanes in water as reported in the above-mentioned Puhringer and Schmidt patents, but they deliberately hydrolyze the silanes and do not produce a stable hydrolyzed silane composition. Wilson, in commonly assigned U.S. Patent Application, Ser. No. 189,146, filed May 2, 1989, now allowed, discloses that hydrolytically stable, water-based, normally hydrolyzable silane emulsions may be prepared by selecting appropriate silanes (largely water insoluble) and appropriate emulsifiers, if the pH is maintained in a predetermined pH stable range, typically 6–8, with a buffering compound. Additionally, Wilson, in commonly assigned U.S. Patent Application, Ser. No. 317,714, filed Mar. 1, 1989, now allowed, discloses buffered silane emulsions compositions in combination with expanded perlite.

However, modern environmental concerns of air quality have made it desirable to develop water-repellents for porous substrates having low levels of volatile organic compounds when cured. Compounds of this nature are especially desirable in light of the increasingly stringent standards on volatile organics set forth by the Environmental Protection Agency (EPA). To this end, it has now been discovered that the buffered silane emulsions of the present invention are eminently suitable for both providing stable compositions useful in rendering masonry, cement and expanded perlite surfaces water repellent, and possessing a sufficiently low volatile organic compound content when cured to satisfy even the most stringent air quality standards.

When used herein and in the appended claims the term "compound for buffering the pH of said composition within said determinable pH stable range" contemplates any substances or combination of substances, which, when dissolved in water produce a solution which resists a change in its hydrogen ion concentration upon the addition of acid or alkali. Although this will call to the mind of those skilled in this art a large family of buffering compounds, numerous illustrations of typical buffering compounds will be set forth hereinafter and in the working examples.

SUMMARY OF THE INVENTION

According to the present invention there are provided buffered aqueous silane emulsions, useful as porous substrate water repellent compositions and having a volatile organic compound content of less than about 400 g/l when cured, comprising effective amounts of: (a) a hydrolyzable silane essentially hydrolytically stable within a determinable pH range; (b) at least one emulsifier having an hydrophile-lipophile balance (HLB) value of from about 1.5 to about 20, preferably 4 to 17; (c) an effective amount of at least one compound for buffering the pH of said composition within said determinable pH stable range; and (d) water.

In one of its embodiments, the present invention also provides a process for increasing the resistance to penetration by aqueous media of a porous substrate by applying to the surface of the substrate a buffered composition as above defined and allowing the composition to cure.

Special mention is made of embodiments of this invention comprising compositions and use of such compositions as defined above, wherein they also include an effective amount of (e) a biocide.

DETAILED DESCRIPTION OF THE INVENTION

By the term "masonry" used herein, is meant any porous inorganic substrate, particularly building compositions and including but not limited to structural ceramics such as common brick, paving brick, face brick, sewer pipe, drain tile, hollow block, terra cotta, conduits, roofing tile, flue lining, cements such as Portland cement, calcined gypsum products, i.e., molding and building plaster and stucco, magnesia cement, insulation products such as electrical and thermal insulators (diatomaceous earth brick) and porcelain spark plugs, etc.

The masonry materials also include stone, tile, artificial stone, adobe, concrete and reinforced concrete such as found in roadways, bridge decks, airport runways, parking garage decks, and other concrete building structures.

The masonry materials which can be treated in accordance herewith are preferably dry when treated with the water repellent compositions, although they may be wet. In the case of settable masonry materials, the compositions of the present invention may be incorporated in the preset mixture, for example, into a concrete mix prior to casting and setting. Wood, structural timbers, siding and the like can also be made water repellent using this invention.

By the term "expanded perlite", as used herein, is meant compositions which generally comprise any glass rock with the capacity to expand greatly on heating and particularly comprises volcanic glass of rhyolitic composition, containing 2 to 5 percent of combined water. Perlite is generally characterized by a system of concentric, spheroidal cracks which are called perlite structures. Expanded perlite denotes any glass rock and more particularly a volcanic glass which has expanded suddenly or "popped" while being heated rapidly. This "popping" generally occurs when the grains of crushed perlite are heated to the temperatures of incipient fusion. The contained water is converted to steam and the crushed particles form light, fluffy, cellular particles. Volume increases of the particles of at least ten fold are common. Different types of perlite are characterized by variations in the composition of the glass affecting properties such as softening point, type and degree of expansion, size of the bubbles and wall thickness between them, and porosity of the product. See generally; *Encyclopedic Dictionary of Industrial Technology, Materials, Process and Equipment*, (1984), pages 226-27 and Grant; *Hackh's Chemical Dictionary*, The Blakiston Company, Inc., 3rd Edition (1944).

The compositions of the present invention all possess a volatile organic compound (VOC) content of less than about 400 g/l when cured, preferably less than about 350 g/l, more preferably less than about 300 g/l and most preferably less than about 250 g/l. The VOC content is determined using Environmental Protection Agency Method 24. The VOC content is calculated according to the following equation:

$$VOC = \frac{d(100 - S - W)}{100 - W}$$

where d=density of material being tested according to ASTM D1475-85; S=percent solids according to ASTM D2369-86; and W=percent water determined by ASTM D4017-81.

The Hydrolizable Silane (a). The water-based compositions of the present invention preferably include as component (a) a hydrolyzable silane, for example, one with a molecular weight up to about 600 (or essentially a multiple thereof, if oligomerized) and the general formula of $R_n$—Si—$(R^1)_{4-n}$, wherein R is a $C_1$-$C_{30}$ hydrocarbyl or halogenated hydrocarbyl group, $R^1$ is a $C_1$-$C_6$ alkoxy, halide, amino, carboxyl, or a mixture of any of the foregoing, and n is 1 or 2. The hydrocarbyl group comprises hydrogen and carbon atoms and may be aliphatic, or cycloaliphatic, or aryl, or aralkyl. These hydrocarbyl radicals may also contain as substituent groups, halogen, e.g., chlorine, bromine, fluorine; nitrogen; oxygen or sulfur heteroatoms. One or more of such halogen substituents may be present in the R group. Preferably the R group is a $C_6$-$C_{30}$ hydrocarbyl or halogenated hydrocarbyl and more preferably the R group is $C_8$-$C_{30}$ hydrocarbyl or halogenated hydrocarbyl. The $R^1$ group can comprise a $C_1$-$C_6$ alkoxy, halogen, amino, or carboxylate group. Thus, among the alkyl groups useful as $R^1$ are methyl, ethyl, n-propyl, and isopropyl. As indicated, n may be 1 or 2 and thus, monohydrocarbyl substituted alkoxysilanes and dihydrocarbyl substituted alkoxysilanes are contemplated by the present invention. The active ingredients of the invention can also comprise condensation dimers and trimers, or other oligomers of the silanes, as are well known in the art. The hydrolyzable silanes (a) can range widely in amount. However, typically the amount can comprise from about 1 to about 60 percent by weight of the composition, and especially from about 10 to about 50 percent by weight.

Silanes especially useful in accordance with the present invention generally have a molecular weight in excess of 135 and preferably greater than 190 up to about 600 for the monomers. The dimers and trimers present in the composition will, of course, have essentially multiples of the molecular weights of the single specie of silane or silanes being used. It should be noted that mixtures of various silanes may be used, if desired.

Specific examples of silanes useful in accordance with the present invention include, but are not limited to, butyltrimethoxysilane, butyltriethoxysilane, dibutyldimethoxysilane, isobutyltrimethoxysilane, di-isobutyldimethoxysilane, isobutyltriethoxysilane, n-hexyltrimethoxysilane, 6-chloro-hexyltrimethoxysilane, 6,6,6-trifluorohexyltrimethoxysilane, cyclohexyltrimethoxysilane, benzyltrimethoxysilane, 4-chlorobenzyltriethoxysilane, 4-bromobenzyltri-n-propoxysilane, phenyltrimethoxysilane, phenyltriethoxysilane, octyltrimethoxysilane, octyltriethoxysilane, octyltriisopropoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, bis(octyldiethoxysiloxane)dimer, decyltriethoxysilane, dodecyltriethoxysilane, bis(dodecyldiethoxysiloxane) dimer, octadecyltrimethoxysilane, 1,3-diethoxyhexamethyltrisiloxane and the like, mixtures of any of them and the like, alone, and in admixture with dimers, trimers and other oligomers thereof.

The Emulsifiers (b). A wide variety of ionic and nonionic emulsifiers have been tried and have been found to be useful in the present invention. Nonionic, anionic, cationic and amphoteric emulsifiers are well known from the state of the art. The preferred emulsifiers are, however, nonionic. The concentration of emulsifier or emulsifiers (b) used in accordance with the present invention may range widely, but preferably is from about 0.5 to about 50 percent by weight of the silane (a) and especially preferably in the range from about 1 to about 8 percent by weight of the silane.

In general, those emulsifiers or emulsifier blends which have an HLB in the range from about 1.5 to about 20, and preferably in the range from about 4 to about 17 may be used herein. The proper HLB value for a given silane or silane mixture must be determined experimentally in order to ascertain the optimum stability.

The HLB classification of surfactants is based on molecular structure and therefore can be used to predict the behavior of single molecules. HLB is determined experimentally by techniques known to those skilled in this art, for example, those set forth in the pamphlet "The HLB System" published by ICI Americas, Inc., Wilmington, DE, U.S.A. See also the publication "Adjuvants for Herbicides", Weed Society of America, Champaign, IL, U.S.A. If the HLB of an emulsifier is below 1.5, it will not be useful in this invention because it will not produce a stable oil-in-water emulsion. If, on the other hand, the HLB is above 20, it also will not be useful because stability is poor. HLB values in the range of 4–17 are preferred because they provide the most stable emulsions of the above mentioned silanes.

Specific examples of emulsifying agents which may be used in accordance herewith include, but are not limited to the following with the HLB value given in parenthesis following the name: sorbitan trioleate (1.8), sorbitan tristearate (2.1), polyoxyethylene sorbitol hexastearate (2.6), glycerol monostearate (3.8), sorbitan monooleate (4.3), sorbitan monostearate (4.7), polyoxyethylene(2 mole) stearyl ether (4.9), sorbitan monopalmitate (6.7), polyoxypropylene mannitol dioleate (8), polyoxyethylene sorbitol oleate (9.2), polyoxyethylene stearate (9.6), polyoxyethylene sorbitan monooleate (10.0), polyoxyethylene monooleate (11.4), polyoxyethylene(6 mole) tridecyl ether (11.4), polyoxyethylene(10 mole) cetyl ether (12.9), polyoxyethylene sorbitan monooleate (15), polyoxyethylene(20 mole) stearyl ether (15.3), polyoxyethylene(15 mole) tridecyl ether (15.4), polyoxyethylene alkylamine (cationic, 15.5); polyoxyethylene alcohols having an HLB of 9.7, about 10, and 11.6; ethoxylated nonylphenols having HLB values of 10, 11 and 12; dialkylphenol ethoxylates having an HLB value of 10.6; block copolymers of ethylene oxide and propylene oxide having HLB values in the range of 5.5 to 15; ethoxylated octyl phenols having an HLB of about 13.5, 17.3, and 17.9; fatty acid glycerides having an HLB value of approximately 4, sodium lauryl sulfate, sodium oleate, mixtures of any of the foregoing, and the like.

The preferred emulsifying agents, given in the table below, provide especially useful emulsions of silanes.

TABLE I

| TYPE OF SURFACTANT | EXAMPLES (SUPPLIER; HLB) |
| --- | --- |
| Polyoxyethylene alcohols | Brij 30 (ICI Americas; 9.7) |
| | Tertigol 15-S-3 (Union Carbide; approx. 10) |
| | Triton DF 16 (Rohm & Haas; 11.6) |
| Ethoxylated nonyl phenols | NP-6 (Union Carbide; 11) |
| | NP-7-(Union Carbide; 12) |
| | CO-520 (GAF; 10) |
| Dialkyl phenol ethoxylate | DM-530 (GAF; 10.6) |
| Block copolymers of ethylene oxide and propylene oxide | Pluronics (BASF) |
| | L42 (8), L62 (7), L64 (15) |
| | L72 (6.5), L92 (5.5), |
| | 25R2 (6.3) |
| | Tetronic 702 (BASF; 7) |
| Fatty acid glycerides | Arlacel 165 (ICI Americas; 4) |
| Sorbitan fatty acid esters | Spans (ICI Americas) |
| | 20 (8.6), 40 (6.7), 60 (4.7) |
| | 80 (4.3) |
| Polyoxyethylene sorbitan | Tween 61 (ICI Americas; 9.6) |
| fatty acid esters | Tween 81 (ICI Americas; 10.0) |
| | Atlas G-1096 |
| Blends of sorbitan esters with polyoxethylene amines | Atlas G-2090 (ICI Americas) |
| Amphoteric | Atlas G-271 (ICI Americas) |
| Polyvinyl alcohol | (Air Products and Chemicals, Inc.) |
| Blend of octylphenol polyoxyethylene ethanol | Triton X-100 and Triton X-305 (Rohm & Haas, about 15) |

Blending may be necessary, and desirable, if one of the emulsifiers, e.g., sodium lauryl sulfate, has an HLB ouside the range of 1.5–20. Sodium lauryl sulfate, HLB about 40, will be blended with a low HLB material, as illustrated above, for use.

Buffering agents. Agents for buffering the compositions within the pH range optimum for silane stability can vary widely in type and amount. The selection of a suitable buffering agent is readily made by techniques well known to those of ordinary skill in this art. Especially convenient is to prepare a silane composition comprising the silane (a), the emulsifier (b), and water (c) in accordance with the teachings of DePasquale and Wilson, U.S. Pat. No. 4,648,904, and to measure the pH and silane concentration initially and then to add the buffering agent candidate. The candidate to be acceptable should maintain the pH level within the said determinable pH range, even when adding substantial quantities of acid or bases, which would ordinarily cause the pH to swing into areas in which substantial silane hydrolysis will occur. Swings of plus or minus one pH unit are tolerable. Also relevant would be a pH swing induced by additions of a biocide that materially alters pH and promotes hydrolysis. Two methods are convenient for measuring long term stability: one is to determine final pH and final silane content, after aging, and the other is to performance test the silane emulsions on mortar cubes using standard test methods, such as those described in the above-mentioned DePasquale and Wilson patent. In the former, using an unsuitable buffering compound will not prevent the pH from swinging into a range promoting hydrolysis, e.g., from 7.5 to 4.0 and the final silane concentration will be materially reduced, e.g., cut from 40 percent to 20 percent and, in extreme cases, all the way down to zero percent. Such a test should be carried out over a significant time period, e.g., after aging the emulsion under test for up to 12 months at room temperature. In the performance test, a 2 inch mortar cube is coated in duplicate with the test emulsion and the coating cured, then immersed in water for 21 days. The percent reduction in weight gain of compound treated cubes compared to untreated control cubes is indicative of the retention of silane content and the efficacy of the buffering agent.

In initial experiments, emulsions were unbuffered and prepared in accordance with prior art procedures. They contained biocide which decomposed to acetic acid and lowered the pH to 4. Within a month of manufacture, such emulsions showed decreased performance in the water repellency test set forth above. They also showed reduced silane concentration, as determined by gas chromatography. After 5 months the state of the art emulsion performed very poorly in water repellency tests on concrete.

Numerous experiments which followed demonstrated that various buffers were effective in raising the pH of the state of the art emulsion to about 7.5, and maintaining the effectiveness of the formulation over a period of time.

When emulsions of predominantly n-octyltriethoxysilane, PCR, Inc.'s PROSIL® 9202 organofunctional silane, buffered in this manner, were analyzed by gas chromatography after one year, over 95 percent of the silane remained unhydrolyzed. Moreover, unbuffered emulsions at pH 4 showed less than 5 percent unhydrolyzed silane after a similar period, indicating the long term stabilizing effect of the buffering compound.

Although buffers are especially important when the emulsion components, particularly biocides, shift the pH away from neutrality, experiments have shown that in other emulsions which are inherently neutral, pH 7, without use of a buffer, the silane remains substantially unhydrolyzed for many months. In such cases the emulsions do not contain a biocide, or they contain an alternative biocide, that does not alter the inherently neutral pH.

Illustrative of buffering agents useful for silane emulsions, especially those containing biocides are: organic and inorganic acids and bases, including salts thereof, and preferably mono- or poly-alkali metal, alkaline earth metal or amine salts of carbonic acid, phosphoric acid, sulfuric acid, hydrosulfuric acid, a $C_1$–$C_6$ organo-, mono- or poly-carboxylic acid, or a $C_2$–$C_{30}$ alkyleneiminopolycarboxylic acid, ammonia, a $C_1$–$C_{30}$ organic base, or a mixture of any of the foregoing. Illustrative are: sodium bicarbonate, sodium carbonate, ammonium carbonate, sodium borate, mono-, di-, or trisodium phosphate, mono-, di-, or tripotassium phosphate, ammonium sodium phosphate, mono-, or disodium sulfate, sodium acetate, potassium acetate, ammonium acetate, calcium acetate, sodium formate, mono-, or disodium sulfide, ammonia, mono-, di, or triethylamine, mono-, di-, or triethanolamine, (ethylenedinitrilo) tetraacetic acid sodium salt (sodium E.D.T.A.), pyridine, aniline, and sodium silicate. These are only a few examples of appropriate buffering agents. Combinations of these materials with other buffers, acids, or bases, such as the use of ammonium hydroxide and acetic acid together, will also be effective.

Trisodium phosphate ($Na_3PO_4$) and ammonium hydroxide ($NH_4OH$) are preferred, but sodium bicarbonate ($NaHCO_3$) is especially preferred because it is easy to handle; it consistently gives emulsions with a pH of 7.5; it is environmentally safe; and it is inexpensive.

The amount of buffering agent to be employed can vary widely. In general, however, less than 0.01 percent will not be enough to be useful, and more than 5 percent by weight of the total composition will be uneconomical.

If a biocidal agent (e) is used, any of those well known in the art for imparting antimicrobial and biocidal activity can be used in conventional amounts, e.g., from about 0.1 to about 5 percent by weight based on the composition. Suitable biocidal agents for these embodiments comprise 6-acetoxy-2,4-dimethyl-m-dioxane, sold by Givaudan Corp. under the trademark Giv-Gard DXN biocide, methyl p-methoxy benzoate, and the like. Typical concentrations of these biocides are 0.15 percent by weight.

In addition to biocides, the buffer stabilized formulations of this invention may include other additives such as fragrances, colorants, thickeners, foaming agents, anti-foaming agents, and the like.

DESCRIPTION OF THE PREFERRED EMBODIMENTS

The following examples illustrate the present invention but the claims are not to be construed as limited thereto.

EXAMPLE 1

To a mixture of 200 g of octyltriethoxysilane and 8 g of an emulsifier mixture comprising 70 percent of octylphenol polyethyleneoxyethanol (Rohm & Haas Triton® X-100) and 30 percent of octylphenol polyethyleneoxyethanol (Rohm & Haas Triton® X-305) HLB of about 15, in a Waring Blendor® mixer is slowly added 292 g of deionized water which contains 6-acetoxy-2, 4-dimethyl-m-dioxane biocide (Givaudan Corp. GIV-GARD® DXN biocide) in an amount to provide 0.15 percent ultimate concentration; and 0.10 percent sodium bicarbonate as a buffering agent. Mixer speed is gradually increased to provide good dispersion without incorporating a large amount of air. After complete addition, the mixture is stirred at high speed for an additional five minutes to provide a buffered emulsion in accordance with this invention, having a pH of 7.5, and which maintains its homogeneous, milky appearance for up to a year or more at room temperature (Example 1). For comparison purposes, an emulsion is prepared in exactly the same way but the sodium bicarbonate buffer is omitted. The pH of this emulsion is 4.0 (Comparative Example 1A). For purposes of further comparison, an emulsion is prepared in the same way, but the biocide is replaced with 0.15 percent of methyl p-methoxy benzoate and the sodium bicarbonate buffer is omitted. The pH of this emulsion is 7.0. (Comparative Example 1B).

The emulsions of Example 1 and Comparative Examples 1A and 1B are analyzed initially for the concentration of silane, $H_{17}C_8Si(OC_2H_5)_3$, and dimer, $H_{17}$, $C_8Si(OC_2H_5)_2$-O-$Si(OC_3H_5)_2C_8H_{17}$ by gas chromatography using a ⅛ in. × 10 ft. 20 percent SP-2100 column, temperature programmed from 100° to 280° C. at 16° C./min., using octamethylcyclotetrasiloxane as an internal standard. After 12 months of aging at about 23° C., the emulsions are again examined for pH and silane concentration. The results obtained are set forth in Table 1:

TABLE 1

| Silane Concentration and pH of Emulsions Before and After aging at 23° C. for 1 year. | | | |
|---|---|---|---|
| EXAMPLE | 1 | 1A | 1B |
| Initial pH | 7.5 | 4.0 | 7.0 |
| Initial silane Concentration, % | 40 | 40 | 40 |
| Final pH | 7.5 | 4.0 | 5.5 |
| Final Silane Concentration, % | 40 | 0 | 20 |

The foregoing data show that a buffering agent in accordance with this invention maintains substantially all of the silane in an unhydrolyzed condition, whereas without the buffering agent the silane content is cut in half or even completely eliminated during long term storage.

For performance testing, aged emulsions prepared as described in Example 1 and Comparative Example 1A above are tested using concrete cubes in accordance with DePasquale and Wilson, U.S. Pat. No. 4,648,904. Cement mortar cubes two inches on the side are conditioned in a control room at 73° F. and 50 percent relative humidity for 21 days to give a constant weight. Each composition to be tested for water repellency is applied to two cubes at the rate of 125 square feet per gallon (3.07 square meters per liter), and the coated cubes are cured on a rack in a control room for 13 days prior to recording the initial weight of each cube. All of the cubes including two untreated control cubes are placed on a rack and immersed in a distilled water bath. After 21 days of immersion the cubes are removed, blotted dry and immediately weighed. The percent weight gain of each block is determined by $$\frac{W(\text{final}) - W(\text{initial})}{W(\text{initial})} \times 100 = \% \text{ Weight Gain}$$

The percent Reduction of Weight Gain is calculated by the formula $$100 \times \frac{(\% \text{ weight gain of control}) - (\% \text{ weight gain of sample})}{(\% \text{ weight gain of control})} = \% \text{ Reduction of Weight gain}$$

Higher Reduction of Weight Gain indicates higher effectiveness as a porous material water repellent. Due to the variability of the mortar blocks, values for % Reduction of Weight Gain have a precision of about plus or minus 5 percent.

The results of concrete water absorption of the aged emulsions are set forth in Table 2:

TABLE 2

| | Concrete Water Absorption using buffered Silane Eulsions | |
|---|---|---|
| Age of Emulsion | REDUCTION OF WEIGHT GAIN % EXAMPLE | |
| months | 1 | 1A |
| 0.25 | 74 | — |
| 0.5 | — | 68 |
| 1.0 | 74 | — |
| 2.0 | — | 52 |
| 3.0 | 74 | — |
| 5.0 | — | 46 |
| 7.0 | 71 | — |
| 9.0 | 71 | — |
| 12.0 | 68 | 5 |

The beneficial effect of using a buffering agent as suggested by silane content data in Table 1 is confirmed by actual water absorption tests set forth in Table 2.

EXAMPLE 2

The procedure of Example 1 is repeated, substituting for the emulsifier used, 3 percent by weight of sorbitan fatty acid esters known as Span ® 20 and Span ® 60 and polyoxyethylene sorbitan fatty acid esters known as Tween ® 81. Spans and Tweens are trademarks of ICI Americas Corp. Stable buffered emulsions in accordance with this invention are obtained.

EXAMPLES 3 AND 4

The procedure of Example 1 is repeated, substituting for the sodium bicarbonate, disodium hydrogen phosphate and a mixture of ammonium hydroxide and acetic acid as buffering agents. Storage stable aqueous emulsions in accordance with this invention are obtained.

EXAMPLES 5-17

The procedure of Example 1 is followed to produce a variety of buffered aqueous silane emulsions. Table 3 below summarizes the theoretical VOC for these buffered aqueous silane emulsions.

TABLE 3

| | THEORETICAL VOC'S FROM SILANES/SILOXANES | | | | | | |
|---|---|---|---|---|---|---|---|
| Example | Silane/Siloxane | Formula | MW | Solids MW[a] | Theoretical Percent Solids[a] | Density (g/ml) | Theoretical[b] VOC(g/l) |
| 5 | Isobutyltrimethoxysilane | $C_7H_{18}O_3Si$ | 178.30 | 109.20 | 61.2 | 0.933 | 360 |
| 6 | Octyltriethoxysilane | $C_{14}H_{32}O_3Si$ | 276.49 | 165.31 | 59.8 | 0.88 | 350 |
| 7 | Bis(octyldiethoxysiloxane) dimer | $C_{24}H_{54}O_5Si_2$ | 478.86 | 330.61 | 69.0 | 0.91 | 280 |
| 8 | Octyltrimethoxysilane | $C_{11}H_{26}O_3Si$ | 234.41 | 165.31 | 70.5 | — | — |
| 9 | Decyltriethoxysilane | $C_{16}H_{36}O_3Si$ | 304.55 | 193.37 | 63.5 | — | — |
| 10 | Decyltrimethoxysilane | $C_{13}H_{30}O_3Si$ | 262.47 | 193.37 | 73.7 | 0.907 | 240 |
| 11 | Dodecyltriethoxysilane | $C_{18}H_{40}O_3Si$ | 332.60 | 221.42 | 66.6 | 0.88 | 290 |
| 12 | Bis(dodecyldiethoxysiloxane)dimer | $C_{32}H_{70}O_5Si_2$ | 591.08 | 442.84 | 74.9 | 0.893 | 220 |
| 13 | Tetradecyltriethoxysilane | $C_{20}H_{44}O_3Si$ | 360.66 | 249.41 | 69.2 | — | — |
| 14 | Hexadecyltriethoxysilane | $C_{22}H_{48}O_3Si$ | 388.71 | 277.53 | 71.4 | 0.859 | 250 |
| 15 | Octadecyltriethoxysilane | $C_{24}H_{52}O_3Si$ | 416.76 | 305.58 | 73.3 | 0.87 | 230 |
| 16 | Octadecyltrimethoxysilane | $C_{21}H_{46}O_3Si$ | 374.68 | 305.58 | 81.6 | — | — |
| 17 | 1,3-Diethoxyhexamethyltrisiloxane | $C_{10}H_{28}O_4Si_3$ | 296.59 | 222.47 | 75.0 | 0.890 | 220 |

MW = molecular weight
[a]Theoretical percent solids are based on total hydrolysis and condensation of the silane/siloxane $R-Si(OR)_3 \rightarrow R-SiO_{3/2}$
[b]Theoretical VOC is calculated according to the formula VOC (g/l) = d(1000-10S) wherein VOC is volatile organic compounds, d is the density of the silane/siloxane in g/ml, and S is the theoretical percent solids.

Thus, Table 3 above demonstrates that the compositions of the present invention possess volatile organic compound contents of less than 400 g/l when cured and some exhibit content levels of less than 250 g/l, making them eminently suitable for use as water proofing sealants even under the strictest environmental air quality regulations.

The above-mentioned patents, patent applications, publications and test methods are incorporated herein by reference.

Many variations of the invention will suggest themselves to those skilled in this art in light of the above, detailed description. For example, the silane can comprise isobutyltrimethoxysilane, octadecyltriethoxysilane, 4R-triethoxysilylmenthene-1, mixtures thereof, and the like. Instead of 40 percent by weight, the composition can comprise 20 percent by weight of silane. The biocide can be omitted. The masonry surface can be an expanded perlite or any cement composition. All such obvious variations are within the full intended scope of the appended claims.

We claim:

1. A buffered aqueous silane emulsion composition having a volatile organic compound content of less than about 400 g/l after curing comprising effective amounts of:
   (a) a hydrolyzable silane essentially hydrolytically stable within a determinable pH range;
   (b) an emulsifier or mixture of emulsifiers having an HLB value of from about 1.5 to about 20;
   (c) at least one compound for buffering the pH of said composition within said determinable pH stable range; and
   (d) water.

2. A composition as defined in claim 1 wherein said composition has a volatile organic compound content of less than about 350 g/l.

3. A composition as defined in claim 2 wherein said composition has a volatile organic compound content of less than about 300 g/l.

4. A composition as defined in claim 3 wherein said composition has a volatile organic compound content of less than about 250 g/l.

5. A composition as defined in claim 1 wherein said hydrolyzable silane (a) comprises from about 1 to about 60 percent by weight of the composition; said emulsifier (b) comprises from about 0.5 to about 50 percent by weight based on (a); said compound for buffering (c) comprises from about 0.01 to about 5 percent by weight based on (a), (b), (c) and (d) combined; and water (d) is present in an amount sufficient to provide 100 percent by weight.

6. A composition as defined in claim 1 wherein said hydrolyzable silane has a molecular weight of up to about 600 and comprises a compound of the general formula

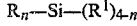
$$R_n\text{---Si---}(R^1)_{4-n}$$

wherein R is $C_1$-$C_{30}$ hydrocarbyl or halogenated hydrocarbyl, $R^1$ is $C_1$-$C_6$ alkoxy, halide, amino carboxyl or a mixture of any of the foregoing and n is 1 or 2, or an oligomer of said compound.

7. A composition as defined in claim 6 wherein R is $C_6$-$C_{30}$ hydrocarbyl or halogenated hydrocarbyl.

8. A composition as defined in claim 7 wherein R is $C_8$-$C_{30}$ hydrocarbyl or halogenated hydrocarbyl.

9. A composition as defined in claim 6 wherein said silane comprises an alkylalkoxysilane.

10. A composition as defined in claim 9 wherein said silane comprises an alkyltrialkoxysilane.

11. A composition as defined in claim 6 wherein R comprises a $C_4$-$C_{12}$ alkyl group, $R^1$ comprises a $C_1$-$C_3$ alkoxy group and n is 1.

12. A composition as defined in claim 6 wherein R comprises a $C_6$-$C_{12}$ alkyl group.

13. A composition as defined in claim 1 wherein said silane comprises octyltriethoxysilane.

14. A composition as defined in claim 1 wherein said silane comprises isobutyltrimethoxysilane.

15. A composition as defined in claim 1 wherein said silane comprises bis(octyldiethoxysilane) dimer.

16. A composition as defined in claim 1 wherein said silane comprises octyltrimethoxysilane.

17. A composition as defined in claim 1 wherein said silane comprises decyltriethoxysilane.

18. A composition as defined in claim 1 wherein said silane comprises dodecyltriethoxysilane.

19. A composition as defined in claim 1 wherein said silane comprises bis(dodecyldiethoxysiloxane)dimer.

20. A composition as defined in claim 1 wherein said silane comprises tetradecyltriethoxysilane.

21. A composition as defined in claim 1 wherein said silane comprises hexadecyltriethoxysilane.

22. A composition as defined in claim 1 wherein said silane comprises octadecyltriethoxysilane.

23. A composition as defined in claim 1 wherein said silane comprises octadecyltrimethoxysilane.

24. A composition as defined in claim 1 wherein said silane comprises 1,3-diethoxyhexamethyltrisiloxane.

25. A composition as defined in claim 5 wherein the concentration of said silane (a) comprises from about 10 to about 50 percent by weight of said composition.

26. A composition as defined in claim 1 wherein said emulsifier (b) has an HLB value of from about 4 to about 17.

27. A composition as defined in claim 1 wherein said emulsifier (b) comprises at least one nonionic emulsifying agent.

28. A composition as defined in claim 27 wherein said emulsifier (b) comprises at least one alkylphenol polyethyleneoxyethanol.

29. A composition as defined in claim 28 wherein said emulsifier (b) comprises at least one octylphenol polyethyleneoxyethanol.

30. A composition as defined in claim 5 wherein the concentration of said emulsifier (b) comprises from about 1 to about 8 percent by weight based on silane (a).

31. A composition as defined in claim 1 wherein said compound for buffering (c) comprises a mono- or polyalkali metal, alkaline earth metal or amine salt of carbonic acid, phosphoric acid, sulfuric acid, hydrosulfuric acid, a $C_1$-$C_6$ organo-, mono- or poly-carboxylic acid, or a $C_2$-$C_{30}$ alkyleneiminopoly carboxylic acid, ammonia, a $C_1$-$C_{30}$ organic base, or a mixture of any of the foregoing.

32. A composition as defined in claim 31 wherein said compound for buffering (c) comprises an alkali metal carbonate or -bicarbonate, or -phosphate or ammonia.

33. A composition as defined in claim 32 wherein said compound for buffering (c) comprises sodium bicarbonate.

34. A composition as defined in claim 1 wherein the said buffering compound (c) provides a pH in the range of from about 6 to about 8.

35. A composition as defined in claim 34 wherein said buffering compound (c) provides a pH of about 7.5.

36. A composition as defined in claim 1 which also includes
   (e) a small, effective amount of a biocide.

37. A process for increasing the resistance to penetration by aqueous media of a porous substrate, said process comprising:
   (i) applying to the surface of said substrate a buffered aqueous silane emulsion composition having a volatile organic compound content of less than about 400 g/l when cured comprising effective amounts of:

(a) a hydrolyzable silane essentially hydrolytically stable within a determinable pH range;
(b) an emulsifier or mixture of emulsifiers having an HLB value of from about 1.5 to about 20;
(c) at least one compound for buffering the pH of said composition within said determinable pH stable range; and
(d) water; and
(ii) allowing said composition to cure.

38. A process as defined in claim 37 wherein said composition has a volatile organic compound content of less than about 350 g/l.

39. A process as defined in claim 38 wherein said composition has a volatile organic compound content of less than about 300 g/l.

40. A process as defined in claim 39 wherein said composition has a volatile organic compound content of less than about 250 g/l.

41. A process as defined in claim 39 wherein said porous substrate comprises masonry, cement, expanded perlite or wood.

42. A process as defined in claim 37 wherein said hydrolyzable silane (a) comprises from about 1 to about 60 percent by weight; said emulsifier (b) comprises from about 0.5 to about 50 percent by weight based on (a); said compound for buffering (c) comprises from about 0.01 to about 5 percent by weight based on (a), (b), (c) and (d) combined; and water (d) in an amount sufficient to provide 100 percent by weight.

43. A process as defined in claim 37 wherein said hydrolyzable silane has a molecular weight of up to about 600 and comprises a compound of the general formula

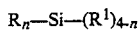

$$R_n\text{—Si—}(R^1)_{4-n}$$

wherein R is $C_1$-$C_{30}$ hydrocarbyl or halogenated hydrocarbyl group, $R^1$ is $C_1$-$C_6$ alkoxy, halide, amino carboxyl or a mixture of any of the foregoing and n is 1 or 2, or an oligomer of said compound.

44. A process as defined in claim 43 wherein R is a $C_6$-$C_{30}$ hydrocarbyl or halogenated hydrocarbyl.

45. A process as defined in claim 44 wherein R is $C_8$-$C_{30}$ hydrocarbyl or halogenated hydrocarbyl.

46. A process as defined in claim 43 wherein said hydrolyzable silane comprises an alkylalkoxysilane.

47. A process as defined in claim 43 wherein said hydrolyzable silane comprises an alkyltrialkoxysilane.

48. A process as defined in claim 43 wherein said hydrolyzable silane comprises a $C_4$-$C_{12}$ alkyl group, $R^1$ comprises a $C_1$-$C_3$ alkoxy group and n is 1.

49. A process as defined in claim 43 wherein said hydrolyzable silane comprises a $C_6$-$C_{12}$ alkyl group.

50. A process as defined in claim 43 wherein said hydrolyzable silane comprises octyltriethoxysilane.

51. A process as defined in claim 37 wherein said silane comprises isobutyltrimethoxysilane.

52. A process as defined in claim 37 wherein said silane comprises bis(octyldiethoxysiloxane)dimer.

53. A process as defined in claim 37 wherein said silane comprises octyltrimethoxysilane.

54. A process as defined in claim 37 wherein said silane comprises decyltriethoxysilane.

55. A process as defined in claim 37 wherein said silane comprises dodecyltriethoxysilane.

56. A process as defined in claim 37 wherein said silane comprises bis(dodecyldiethoxysiloxane)dimer.

57. A process as defined in claim 37 wherein said silane comprises tetradecyltriethoxysilane.

58. A process as defined in claim 37 wherein said silane comprises hexadecyltriethoxysilane.

59. A process as defined in claim 37 wherein said silane comprises octadecyltriethoxysilane.

60. A process as defined in claim 37 wherein said silane comprises octadecyltrimethoxysilane.

61. A process as defined in claim 37 wherein said silane comprises 1,3-diethoxyhexamethyltrisiloxane.

62. A process as defined in claim 37 wherein the concentration of said hydrolyzable silane comprises from about 10 to about 50 percent by weight of said composition.

63. A process as defined in claim 37 wherein said emulsifier (b) has an HLB value of from about 4 to about 17.

64. A process as defined in claim 37 wherein said emulsifier (b) comprises at least one nonionic emulsifying agent.

65. A process as defined in claim 37 wherein said emulsifier (b) comprises at least one alkylphenol polyethyleneoxyethanol.

66. A process as defined in claim 37 wherein said emulsifier (b) comprises at least one octylphenol polyethyleneoxyethanol.

67. A process as defined in claim 37 wherein said emulsifier (b) comprises from about 1 to about 8 percent by weight based on silane (a).

68. A process as defined in claim 37 wherein said compound for buffering comprises a mono- or polyalkali metal, alkaline earth metal or amine salt of carbonic acid, phosphoric acid, sulfuric acid, hydrosulfuric acid, a $C_1$-$C_6$ organo-, mono-, or polycarboxylic acid, or a $C_2$-$C_{30}$ alkyleneiminopolycarboxylic acid, ammonia, a $C_1$-$C_{30}$ organic base, or a mixture of any of the foregoing.

69. A process as defined in claim 37 wherein said compound for buffering (c) comprises an alkali metal carbonate or -bicarbonate, or -phosphate, or ammonia.

70. A process as defined in claim 37 wherein said compound for buffering (c) comprises sodium bicarbonate.

71. A process as defined in claim 37 wherein said compound for buffering (c) provides a pH in the range of from about 6 to about 8.

72. A process as defined in claim 37 wherein said compound for buffering (c) provides a pH of about 7.5.

73. A process as defined in claim 37 wherein said composition includes.
(e) a small, effective amount of a biocide.

74. A process as defined in claim 37 wherein curing step (ii) is carried out at a temperature of from about 5° to about 50° C. for from about 4 hours to about 350 hours.

* * * * *